Aug. 11, 1942.  W. P. BRADBURY  2,292,739
BUSHING EXTRACTOR
Filed Nov. 28, 1941
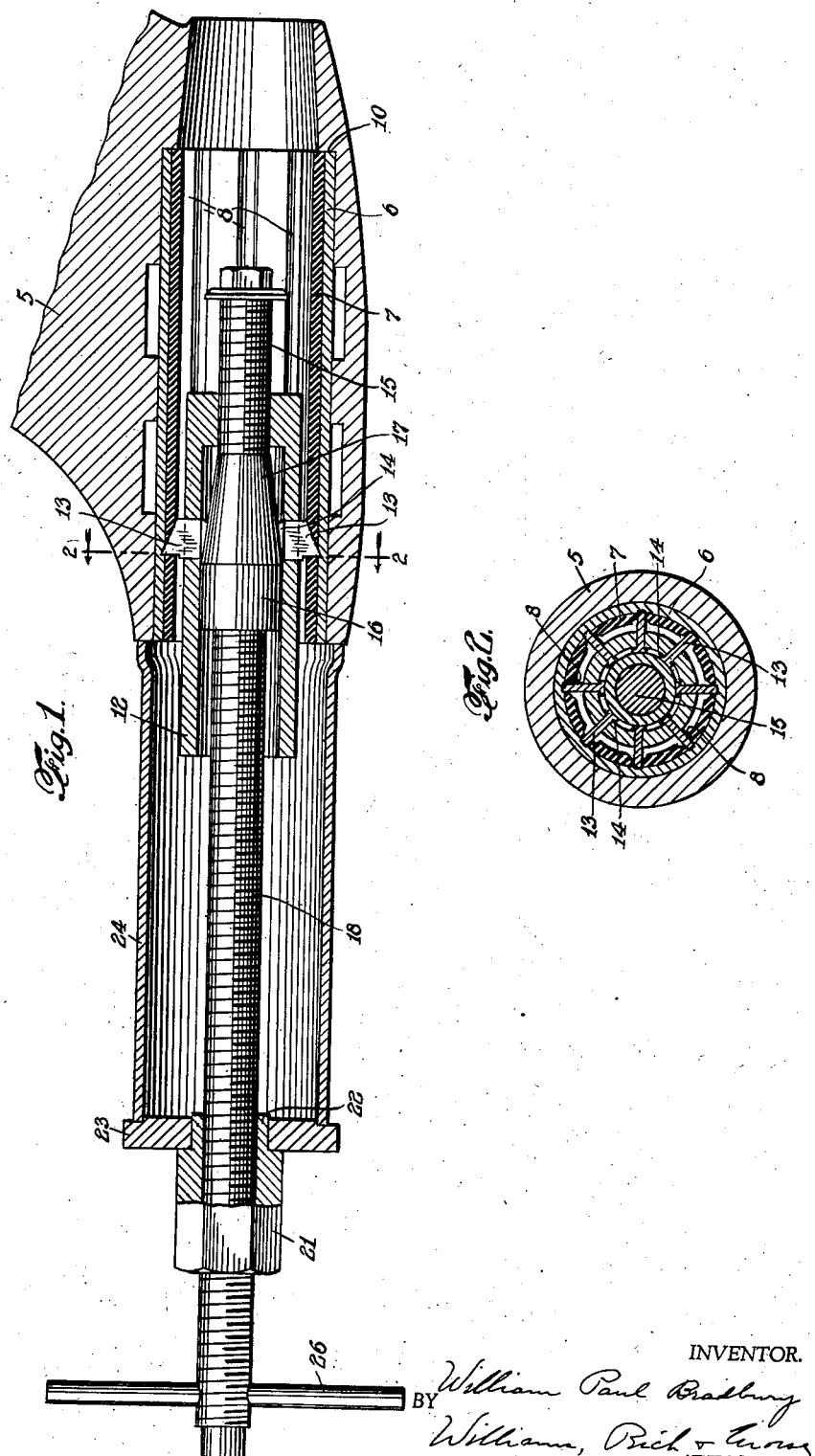
INVENTOR.
William Paul Bradbury
BY Williams, Rich & Morse
ATTORNEYS.

Patented Aug. 11, 1942

2,292,739

UNITED STATES PATENT OFFICE 2,292,739

BUSHING EXTRACTOR

William Paul Bradbury, Hythe, Southampton, England, assignor to Hubert Scott-Paine, Hythe, Southampton, England Application November 28, 1941, Serial No. 420,809
In Great Britain August 16, 1940

1 Claim. (Cl. 29—88.2)

This invention relates to tools for extracting bearing bushings from housings, and is particularly useful when the housing has a shoulder against which an end of the bushing abuts thereby making that end not accessible for engagement by a driving tool. One example of such a bushing is a so-called "cut-less" bearing for a propeller-shaft stern bracket of a motor-boat. A bearing of this kind usually comprises a brass shell within which is vulcanized a rubber bearing lining provided with longitudinal grooves; such bushings being ordinarily housed in a cylindrical recess in the propeller shaft bracket which is provided at its forward end with a shoulder against which the brass shell is driven, thereby leaving accessible at that end of the bushing only the rubber lining which is not suitable for the application of end pressure for driving out the brass shell and the rubber lining vulcanized to it.

The invention will be understood from the following description of a preferred embodiment thereof shown in the accompanying drawing in which Fig. 1 is an elevation, partly in section, of the driving tool in position within a cut-less bushing which is about to be extracted from its housing; and Fig. 2 is an enlarged section on the line 2—2 of Fig. 1.

In the drawing, a propeller shaft stern bracket 5 is shown as provided with a "cut-less" bearing comprising a brass shell 6 within which is vulcanized a rubber bearing lining 7 having longitudinal grooves 8 therein. The shell 6 and lining 7 together constitute a bushing which is driven into the propeller shaft stern bracket 5 from the left (after) end against a shoulder 10 at the right (forward) end of the bracket. The bearing thus formed supports the propeller shaft (not shown) which passes through the stern bracket. It is this bushing composed of the shell 6 and rubber lining 7 which the tool hereinafter described is particularly adapted to remove from the bracket 5 when renewal of the bearing is necessary.

The bushing extractor shown in the drawing has a cylindrical body member 12 which is of such diameter that it has a fairly tight sliding fit in the bushing which is to be extracted. Said body member 12 is provided with a plurality of openings adapted to receive pawls or dogs 13 which are slidable in said openings and are provided at their outer ends with a sharp edge or point adapted to pierce the rubber lining 7 of the bushing and grip the brass shell 6, and at their inner ends with lips 14 which prevent the dogs from falling out of the body member 12 when the tool is not in use. As shown in the drawing, the body member 12 is cup-shaped and is provided at its end with a threaded opening which receives the threaded end 15 of a spindle or drawbar having a cylindrical portion 16 and a conical portion 17 located within the body member 12 and cooperating with the dogs 13 as a wedge for displacing said dogs radially outwards. The wedging action is obtained by rotating the spindle which causes the threaded portion 15 thereof to traverse the threaded opening in the body member 12, thereby producing longitudinal movement of the conical portion 17 of the spindle and the pushing outwards of the dogs 13 the outer pointed ends of which penetrate the rubber lining 7 of the bearing and grip the brass shell 6. The said spindle has another threaded portion 18 which projects a sufficient distance out of the body member 12 and carries a nut 21 having a reduced end 22 rotatable in a hole in a disc 23 which engages an end of a tube 24 surrounding the threaded portion 18 of the spindle and cooperating with the left (after) end of the housing 5. Thus the disc 23 and the tube 24 serve as an abutment for the nut 21, so that rotation of said nut on the threaded portion 18 of the spindle effects an axial movement of the spindle without rotating it. For convenience in operation, a tommy-bar 26 is provided at the end of the spindle, as shown in the drawing.

The rubber bushing lining 7 shown in the drawing is provided with eight longitudinal grooves 8; and the particular bushing extractor shown in the drawing is provided with eight dogs 13 circumferentially spaced in the body member 12 so that said dogs will enter the grooves 8 of the rubber lining 7. However, the number of dogs in the bushing extractor need not be the same as the number of longitudinal grooves in the rubber lining of the bushing to be extracted; and the extractor may be used with a bushing having no longitudinal grooves and, in fact, having no rubber lining.

In the operation of the tool, the spindle is rotated in the body member 12 to such a position that the conical wedge 17 permits the dogs 13 to recede sufficiently far to enable the tool to be inserted in the bushing to be extracted. When the tool is used with a grooved rubber-lined bushing having the same number and arrangement of grooves as the dogs of the tool, the dogs can be aligned with the grooves so that they need be only partially withdrawn within the body member 12. After the body member 12 has been inserted into the bushing so that the dogs 13 when projected from the body member 12 will engage the bushing at a considerable distance from the end thereof so as to insure a good grip on it, the spindle is rotated in the body member 12 by means of the tommy-bar 26, thereby moving the conical wedge 17 with reference to the dogs 13 and causing the sharp ends of the latter to penetrate the rubber lining 7 and grip the brass shell 6. After this gripping action has been effected, the nut 21 on the outer portion 18 of the spindle is appropriately rotated by a wrench or other convenient means; and since the nut 21 engages the abutment formed by the disc 23 and the tube 24 the spindle is withdrawn without rotating, and carries with it the body member 12 and its associated dogs 13 which, being in gripping engagement with the bushing, withdraws the latter from the housing 5 either entirely or sufficiently to enable it to be completely pulled out of the housing by any ordinary means.

It will be understood that the tool may be disengaged from gripping engagement with the bushing by turning the spindle by means of the tommy-bar 26 in the direction which causes the conical wedge 17 to move to the position which permits inward movement of the dogs 13. Then light hammer blows on the outer end of the spindle will move the body member 12 carrying the dogs 13 inwardly in the bushing, thereby causing the dogs to move inwardly out of gripping engagement with the bushing. The tool may then be removed from the bushing, and it is ready for use again.

What is claimed is:

A bushing extractor comprising a cup-shaped cylindrical body member having a threaded opening in the end thereof and adapted to enter the bushing which is to be extracted from its housing, said body member being provided in its cylindrical portion with a plurality of radially extending openings, dogs movably arranged in said openings and adapted to engage the bushing to be extracted, a spindle having a threaded end cooperating with the threaded opening in the end of the cup-shaped body member and having a conical portion located within said cup-shaped member and cooperating with said dogs to force the latter outwardly into engagement with said bushing, said spindle being also provided with a threaded portion extending out of the open end of said cup-shaped member, a tube surrounding the last-mentioned threaded portion of said spindle and adapted to cooperate with said housing, a disc cooperating with the end of said tube and having an opening through which the last-mentioned threaded portion of the spindle passes, and a nut threaded on said spindle and cooperating with the outer side of said dog.

WILLIAM PAUL BRADBURY.